United States Patent [19]

Galloway

[11] 4,405,891
[45] Sep. 20, 1983

[54] CONTROL SYSTEM FOR ELECTRIC POWERED VEHICLE

[75] Inventor: James H. Galloway, New Baltimore, Mich.

[73] Assignee: Energy Development Associates, Inc., Madison Heights, Mich.

[21] Appl. No.: 282,497

[22] Filed: Jul. 13, 1981

[51] Int. Cl.³ .......................................... H01M 10/44
[52] U.S. Cl. ..................................... 320/15; 180/65 A
[58] Field of Search ................. 180/65.1; 307/10 R, 307/10 BP; 320/2, 3, 4, 15–17, 19; 429/15, 17

[56] References Cited

U.S. PATENT DOCUMENTS

| | | | |
|---|---|---|---|
| 3,090,871 | 5/1963 | Gorman | 307/10 R |
| 3,560,832 | 2/1971 | Kirk | 180/65.1 |
| 3,616,872 | 11/1971 | Taylor | 320/2 X |
| 3,904,947 | 9/1975 | Crews | 307/10 BP X |
| 3,915,745 | 10/1975 | Ikeda et al. | 429/15 |
| 3,935,024 | 1/1976 | Symons | 429/15 |

Primary Examiner—William M. Shoop
Attorney, Agent, or Firm—Body, Vickers & Daniels

[57] ABSTRACT

In a control system for an electric powered vehicle of the type including a D.C. motor drivingly connected to roadway engaging drive wheels, there is provided an improvement. A control system for this type of vehicle has a controller for operating the D.C. drive motor with a voltage having a pre-selected magnitude, a first storage battery supported on the vehicle and having a charging mode and a discharging mode with a voltage rating during both of the modes being generally equal to the pre-selected magnitude, a circulation pump associated with the first storage battery for activating this battery, also driving the circulation pump during the discharge mode of the first storage battery. The improved control system in this type of an environment includes a second storage battery, a manually actuated starting switch for allowing the D.C. motor to be driven by the first storage battery, the second storage battery also driving the circulation pump for limited time after manual actuation of the starter. Also, the improved control system is useable when two pumps are associated with the first storage battery and then includes a control circuit for driving one pump selectively by the second storage battery and an enabling circuit for actuating the drive control by the second storage battery so that the vehicle responds to the second storage battery at least during initial operation.

16 Claims, 6 Drawing Figures

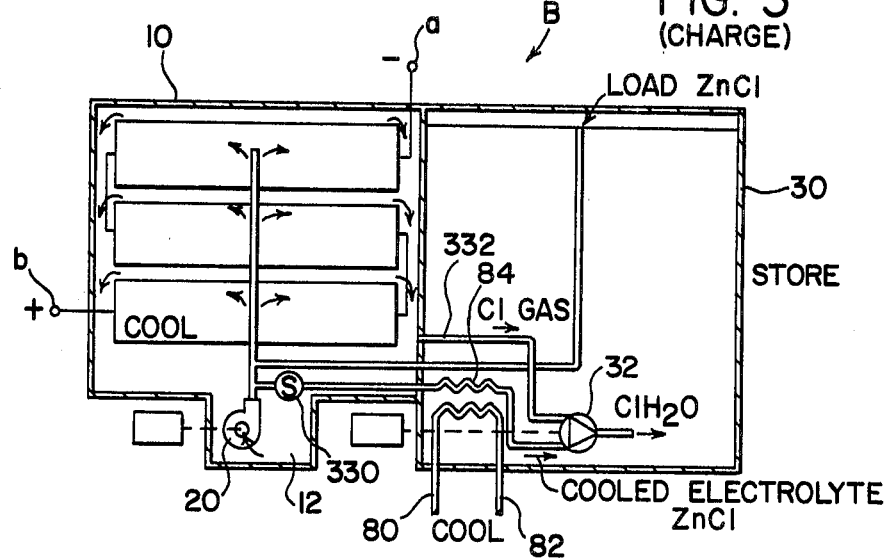
FIG. 3 (CHARGE)
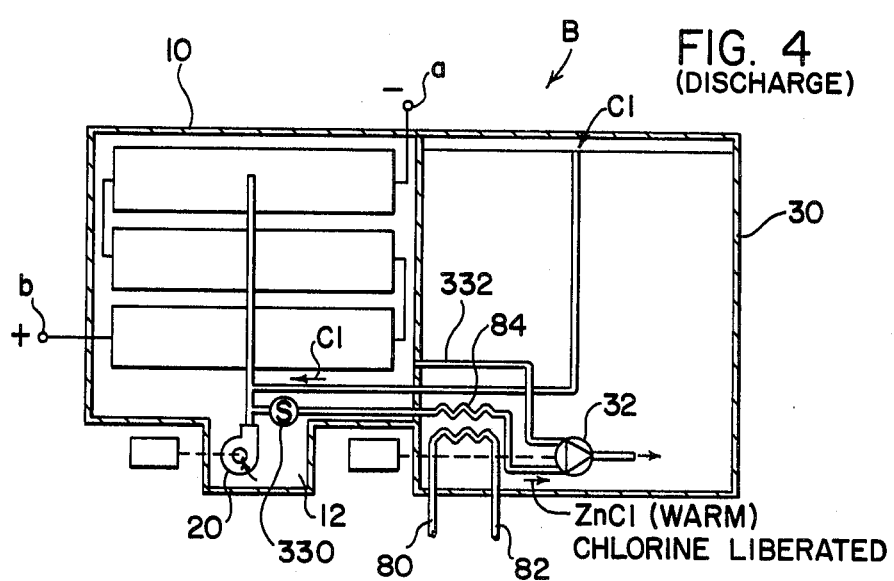
FIG. 4 (DISCHARGE)

CONTROL SYSTEM FOR ELECTRIC POWERED VEHICLE

The present invention relates to the art of electric powered motor vehicles and more particularly to an improved control system for such electric powered motor vehicles. The invention is particularly applicable for use with a zinc-chloride battery system such as disclosed in prior U.S. Pat. No. 3,935,024; however, it has broader applications and may be used with motor vehicles driven by various batteries having characteristics of the zinc-chloride battery.

BACKGROUND OF INVENTION

In recent years there has been a tremendous worldwide effort to develop motor vehicles operated by a fuel other than a petroleum distillate. Such efforts have resulted in hydrogen powered vehicles, steam powered vehicles and electric powered vehicles, the latter of which has been adopted as the most promising alternate to the normal gasoline consuming internal combustion engine. With adoption of the electric motor vehicle as the proposed answer to such a crucial problem, there has been a need to develop an on-board source of electrical power. Since fuel cells, nuclear generators and other systems have not been perfected to a degree which allows their immediate use on motor vehicles, most developmental efforts in commercializing electric powered motor vehicles now involve the use of a storage battery carried by the vehicle. For that reason, various types of storage batteries have been developed with the objective of increasing the range between chargings, without sacrificing operating speed and/or decreasing the time and effort required in actually charging the on-board storage battery. These objectives have now been generally satisfied by a zinc-chloride battery of the type commercialized by Energy Development Associates and disclosed in U.S. Pat. No. 3,935,024. This patent is incorporated by reference herein as background information regarding the power supply or main storage battery to which the present invention is directed.

When utilizing an electric powered motor vehicle having an on-board storage battery for providing the driving force to the roadway engaging wheels, one major drawback has been the control system for the vehicle. This control system should allow operation, by a driver with sensations as close as possible to the standard internal combustion engine driven vehicle. In this manner, the buying public will not experience a training period for converting their driving habits from internal combustion engines to electric power. Such a control system is still needed and especially for an electric powered vehicle of the type using a zinc-chloride battery as the main power source.

THE INVENTION

In accordance with one aspect of the invention there is provided an improvement in the control system for an electric powered motor vehicle of the type including a D.C. motor drivingly connected to roadway engaging drive wheels. This type of motor vehicle includes a control system with a control means for operating the D.C. drive motor with a voltage having a preselected magnitude, a main or first storage battery supported on the vehicle and having a charging mode and a discharging mode with a voltage rating during both of these modes generally equal to the preselected magnitude, a circulation pump associated with the main storage battery and means for driving this circulation pump during discharging mode of the main storage battery, which discharging mode is the vehicle driving mode. The improvement is the provision in the control system of a second storage battery, manually actuated start means for allowing the D.C. motor to be driven by the main storage battery and means for driving the circulation pump with the second storage battery for a limited time after manual actuation of the start means. By this arrangement, the second storage battery can be used to drive the circulation pump of the first storage battery when the vehicle is selectively energized, such as by the ignition switch of a standard internal combustion engine driven vehicle. This type of actuation, which is indicated to be a manual actuation, allows the D.C. motor to be driven by the main storage battery which is made operative by driving the circulation pump with the second storage battery. Consequently, the operation of a start means, analogous to an ignition switch, powers the circulation pump of the first storage battery for a preselected time. This allows immediate use of the storage battery irrespective of the temperature and length of time the vehicle has been out of service. In this manner, an operator may enter the vehicle, manipulate the ignition switch and proceed even though the vehicle is provided with a battery that requires a circulation pump for activation, even when the pump is normally operated by the main battery itself.

In accordance with another aspect of the invention, the limited time of operation of the circulation pump by the second battery is controlled by a characteristic of the first or main battery. This characteristic may be voltage across the main battery or temperature within the main battery.

In accordance with still a further aspect of the present invention, a control system of the type generally described above is provided with two separate electrical control circuits one of which includes the first or main storage battery and the second of which includes the second or auxiliary storage battery. These dual control circuits have a different voltage level, in practice a 120 volts D.C. and 12 volts D.C. An external connection on the vehicle itself is adapted to be connected to an external voltage source corresponding to the voltage of the main or first storage battery, i.e. 120 volts D.C. By connecting the dual control circuits with a voltage converter, the main battery may be charged at the same time as the storage battery is charged by the external power source. The selective energizing of the circulation pump for actuating the main battery, upon starting of the vehicle is through the use of a second generally parallel control circuit. This second circuit incorporates the auxiliary battery having a lower voltage and a limited duty cycle. Thus, during starting of the vehicle, the second storage battery with its own control circuit is used to actuate the first storage battery with its separate and distinct control circuit. By using this dual circuit control system, the external charging source can charge the main battery at a high voltage while the auxiliary battery is being charged simultaneously at a lower voltage through a standard DC/DC converter. During operation, the main battery can maintain the voltage level on the auxiliary battery for subsequent starting at locations distant from the charging station. Thus, the main battery maintains the auxiliary battery in a standby charged state ready for subsequent starting of the vehicle. This adds versatility and flexibility which is essential for the commercial acceptance of an electric powered motor vehicle. It also allows the use of the zinc-chloride battery which is considered by many as the only commercial battery ready for immediate use on motor vehicles.

The primary object of the present invention is the provision of an improved control system for a motor vehicle, which control system includes two separate storage batteries with individual circuits with one of the circuits being used as a starting circuit available instantaneously and the other circuit being a drive circuit actuated by, and subsequent to the starting or auxiliary circuit.

Another object of the present invention is the provision of an improved control system for an electric powered motor vehicle, as defined above, which control system utilizes a low voltage starting circuit.

Still a further object of the present invention is the provision of a control system, as defined above, which control system drives a circulation pump for activating the main battery circuit with the auxiliary battery circuit, at least during initial operation of the motor vehicle and until the main battery can drive the circulation pump.

Still a further object of the present invention is the provision of a control system for an electric powered motor vehicle, which system provides the operator with driving characteristics generally matching the characteristics of an internal combustion engine driven vehicle.

These and other objects and advantages will become apparent from the following description taken together with the accompanying drawings.

BRIEF DESCRIPTION OF DRAWINGS

FIG. 3 is a sectioned view and flow diagram illustrating, schematically, certain operating characteristics of the main battery shown in FIG. 2, when in the battery charging mode;

FIG. 4 is a view and diagram similar to FIG. 3 illustrating the primary storage battery during its discharge mode, i.e., its vehicle driving mode;

PREFERRED EMBODIMENT

Figure 1:
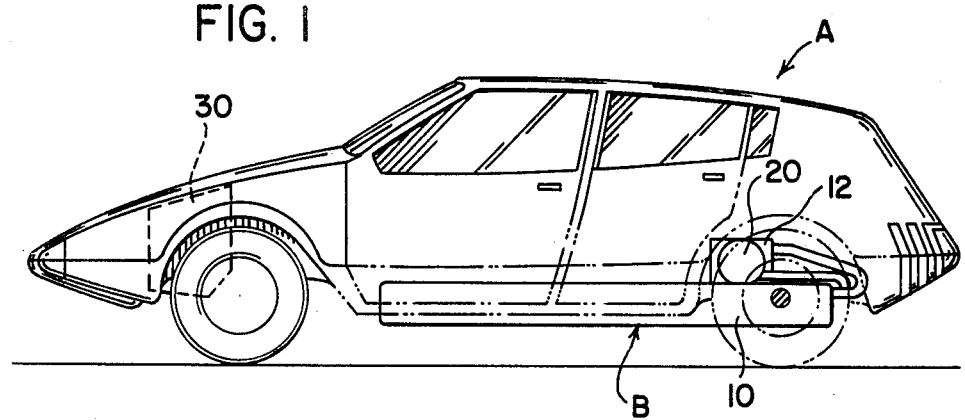
FIG. 1 is a side elevational view showing a motor vehicle with a primary storage battery superimposed thereon.
Figure 2:
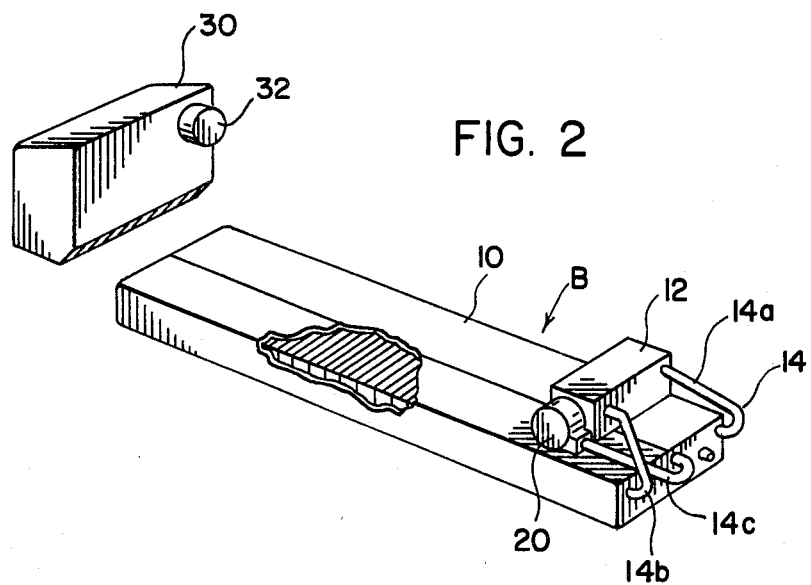
FIG. 2 is a pictorial view showing, somewhat schematically, the preferred primary storage battery employing the control system of the present invention.
Figure 5:
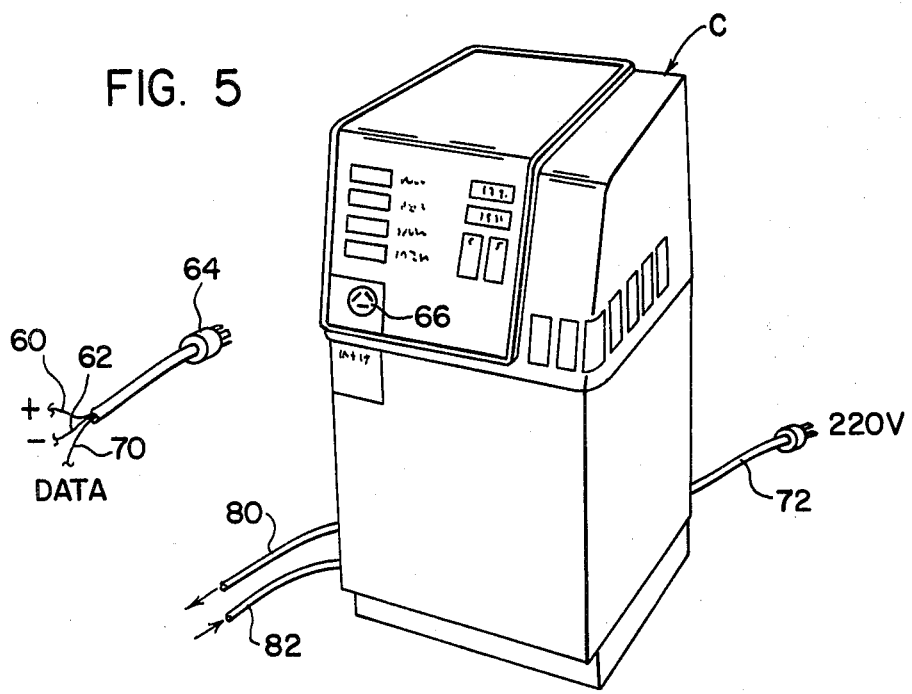
FIG. 5 is a pictorial view illustrating the fixed charging unit to be used for charging the main and auxiliary battery employed in the preferred embodiment of the present invention; and, FIG. 6 is a schematic block diagram illustrating a control system constructed in accordance with the present invention and employing the main battery as schematically illustrated in FIGS. 1 and 2.

Referring now to the drawings wherein the showings are for the purpose of illustrating a preferred embodiment only and not for the purpose of limiting same, an electric powered motor vehicle A is driven by a main storage battery B of the zinc-chloride type, shown in U.S. Pat. No. 3,935,024, incorporated by reference herein. This type of zinc-chloride battery is manufactured by/or for Energy Development Associates and has a substantially greater driving range between charges than other batteries being suggested for use in electric powered motor vehicles. This zinc-chloride battery is now being considered as the power source for electric powered motor vehicles, such as vehicle A. A zinc-chloride battery or similar battery includes a stack portion 10 containing the electric cells and a reservoir or sump 12 for storage of electrolyte. Piping 14 including return pipes 14a, 14b and pressure line 14c are employed for circulating electrolyte by a 12 volts D.C. circulation pump 20. Storage tank 30 for chlorine hydrate is connected by appropriate gas lines, not shown, and includes an internal pump 32 for pumping gaseous material from stack 10 during the charging cycle of battery B. As so far described, the main driving battery B of vehicle A is a standard zinc-chloride battery having, in the preferred embodiment, two groups of thirty cells, each of which produces approximately 2.0 volts D.C. Thus, the output across leads a, b, in practice, is approximately 120 volts D.C. Of course, various other voltages could be obtained by different numbers of battery cells in stack 10. This type of storage battery is charged in accordance with the arrangement schematically illustrated in FIG. 5 wherein zinc-chloride battery B is selectively connected to a fixed charging unit C external of vehicle A and connected to the vehicle by electrical lines 60, 62 terminating in a plug 64. Unit C produces 20 volts D.C. during a charging cycle. This voltage is applied to battery B by lines 60, 62 when plug 64 is manually inserted into receptacle 66. At that time, an information or communication line 70 containing digital data or instructions for unit C is directed from the vehicle to unit C. This information, which does not form a part of the present invention, indicates the condition of the main battery B within vehicle A and controls the charging unit C. For instance, the unit can be shut down when a fully charged condition has been established for battery B. Unit C which can be in a garage or parking lot, is powered by an appropriate 220 volts A.C. input line 72 and has two glycol coolant lines 80, 82. These lines circulate the coolant from unit C through the tubes of battery B, as shown in FIG. 3. When unit C is connected to battery B in the charging mode, as shown in FIG. 3, both pumps 20 and 32 are operating. This circulates electrolyte through stack 10 and pumps chlorine by gas pump 32 into the storage tank 30. As explained in the prior patent, chlorine hydrate is formed in tank 30 due to the chilling action of coolant circulating through lines 80, 82 adjacent the intake line 84 which draws a slight amount of electrolyte for forming chlorine hydrate at the outlet of pump 32.

After the charging has been accomplished, unit C is disconnected and vehicle A is allowed to travel the roadway until the next charge is required. The discharging cycle for battery B is schematically illustrated in FIG. 4 wherein liquid circulation pump 20 is driven by battery B through a control that employs 12 volts D.C. This pump circulates electrolyte; however, voltage is not developed across terminals a, b until stack 10 reaches a certain characteristic or level of operation. This can be indicated by the voltage across main battery B. To accomplish this operation, it is necessary to drive pump 20 to activate battery B so that the operating characteristic which indicates functioning of battery B can be accomplished. This initial operation of pump 20 is by an auxiliary battery B', shown in FIG. 6. During the initial start up of vehicle A circulation pump 20 is driven by battery B'.

Figure 6:
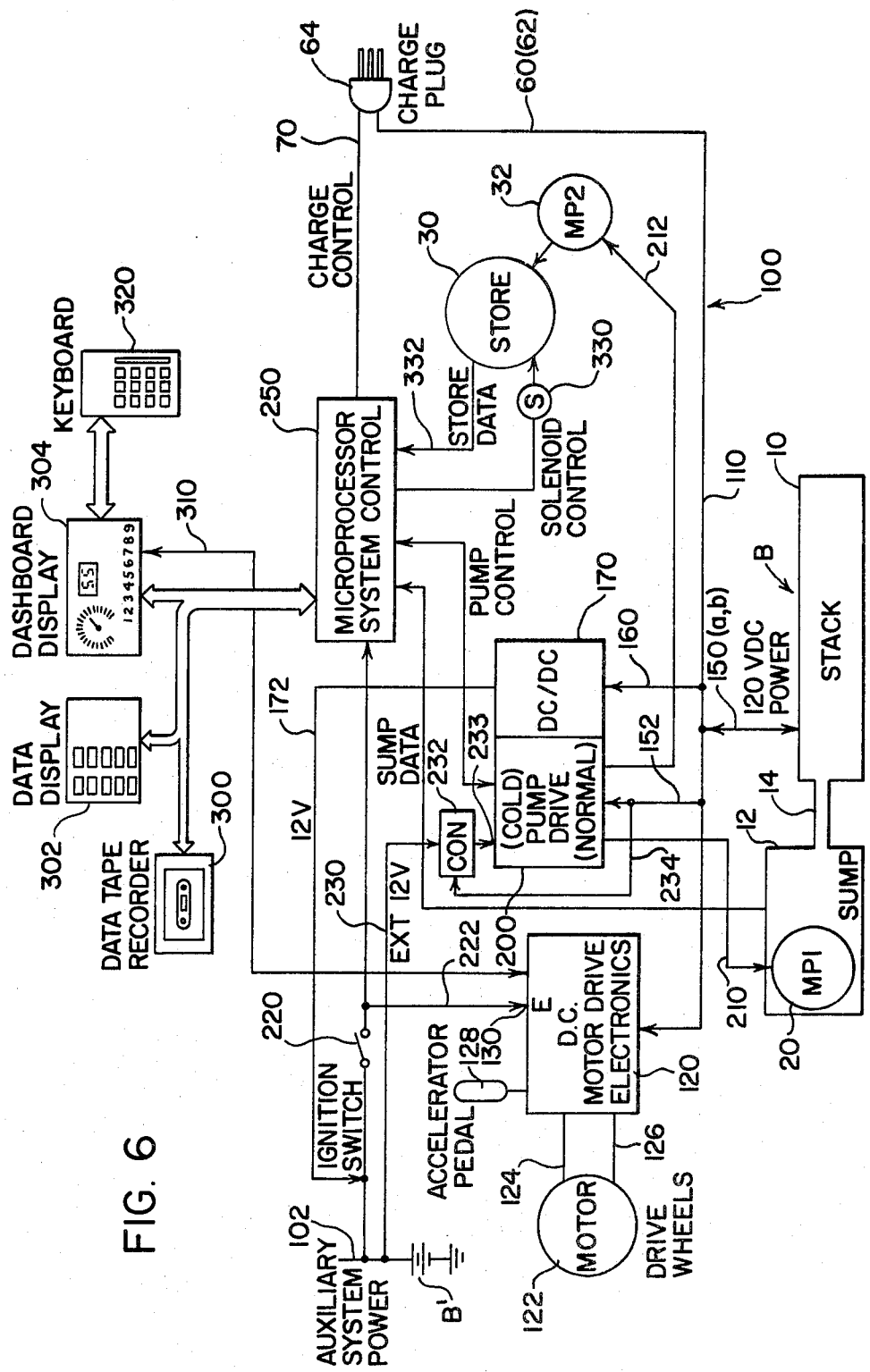

Referring now more particularly to FIG. 6, the preferred embodiment of the present invention as employed with vehicle A and battery B is illustrated. This system utilizes a main control circuit 100 having a nominal voltage magnitude of 120 volts D.C., which is the output voltage of zinc-chloride battery B. An auxiliary control circuit 102 has a nominal voltage of 12 volts D.C. and it is provided by an appropriate battery B' which, in practice may be a lead-acid battery. Battery B' is the basic driving force for the auxiliary control circuit 102. Referring more particularly to circuit 100, this higher voltage circuit employs a main power bus 110 which is connected directly from battery B to an appropriate D.C. drive control device 120. This control device in the present invention may take any structural form as long as it selectively drives D.C. motor 122 by applying voltage across lines 124, 126 in a magnitude determined by the manually adjusted position of accelerator pedal 128. When motor drive control 120 is enabled by receiving a 12 volts D.C. starting voltage level at enabling terminal 130 the control can operate motor 122 by bus 110. To connect main power bus 110 with drive control unit 120, lines 150 are provided. These lines are connected to the previously described terminals a, b, of battery B. Pump drive line 152 connects the main control circuit 100 with pump drive unit 200 having output lines 210, and 212. Voltage applied to the pumps by lines 210, 212 drive pumps 20, 32, respectively. This voltage is 12 volts D.C. and pump 20 can be driven by the auxiliary circuit until battery B is activated. Thus, main control circuit 100 drives motor 122 and pump drive unit 200 during normal operation.

The drive wheels may be driven by the motor 122 only when ignition switch 220 is closed. Ignition switch 220 is connected to the auxiliary battery B', and connects B' to the enabling line 222 when closed. D.C. motor drive electronics 120 and motor 122 are maintained in an inoperable state, until the enabling signal is produced at line 222 to the motor drive electronics. The enabling signal is derived from battery B' since it may be the only power source available at initial start-up. In this manner, when ignition switch 220 is closed, the auxiliary control circuit 102 enables the motor drive unit 120 to allow control of the speed of motor 122 by the adjusted position of accelerated pedal 128. Line 230 connects the auxiliary control circuit 102 with a voltage responsive converter 232 having a 24 volts output line 233. Thus, under normal circumstances when switch 220 is actuated, 24 volts D.C. is applied at line 233 to pump drive control 200. This drives circulation pump 20 to activate battery B by circulating electrolyte through stack 10, irrespective of the temperature or voltage production of the stack. Driving power through line 233 to pump 20 ensures operation of the pump when ignition switch 220 is first actuated. Thus, the auxiliary system provides the start means for circulation pump 20 and the vehicle A. The auxiliary power supply need not drive pump 20 after a voltage of over 24 volts D.C. has been established at battery terminals a, b. This can be sensed by an appropriate transducer schematically illustrated as a line 234. Of course, various transducers could be used to indicate that the operating characteristic of the main battery B is such that it is no longer necessary for the auxiliary battery B' to drive circulation pump 20. When this happens, pump 20 can be switched to main bus 110. Both pumps 20, 32 can be driven by main bus 100, especially during the charging mode of battery B.

In FIG. 6, microprocessor 250 is indicated to be connected to the various components for the purpose of control; however, the present invention does not involve the operation of this microprocessor and it is illustrated only for the completeness of disclosure. This microprocessor is employed, in the illustrated embodiment of the invention, to interconnect the various peripheral accessories, such as a tape recorder 300 to record operating characteristics of battery B and vehicle A, a visual display unit 302 for displaying various characteristics and a dashboard unit 304 which converts digital information from microprocessor 250 to appropriate analog and digital information to be visually inspected by a vehicle operator. Some of this information on the dashboard unit or display 304 is received from motor drive control 210 through sensing lines 310. This information or data could be vehicle speed. An appropriate keyboard 320 can be selectively connected onto dashboard unit 304 for the purpose of interrogating the dashboard and other units through the use of microprocessor 250. These auxiliary units do not form a part of the present invention and are illustrative in nature. Microprocessor 250 is also illustrated as controlling a solenoid 330 and receiving appropriate information from line 332 connected with the storage tank 30. This again is employed for controlling communication between storage tank 30 and sump or reservoir 12 of battery B. Solenoid 330 is also shown in FIGS. 3 and 4. During charging solenoid 330 is opened to allow formation of chlorine hydrate at pump 32. In the discharge mode, microprocessor 250 closes solenoid 330; however, pump 32 circulates gas within the storage tank 30 from gas inlet 332. Periodically solenoid 330 can be opened to bring heated electrolyte into storage tank 30 to liberate more chlorine to control the pressure in stack 10. To do this, microprocessor 250 can monitor the current demand on battery B and control solenoid 330 to anticipate pressure changes in storage tank 30 and chlorine demands in stack 10.

It is possible to connect storage tank 30 with stack 10 by two pumps. One pump could be used to supply warm electrolyte to storage tank 30 for creation of chlorine for use by stack 10.

Having thus defined the invention, the following is claimed:

1. In a control system for an electric powered motor vehicle of the type including a D.C. motor drivingly connected to roadway engaging drive wheels of said vehicle, said control system including control means for operating said D.C. drive motor with a voltage having a pre-selected magnitude; a first storage battery supported on said vehicle and having a charging mode and discharging mode with a voltage rating during both of said modes generally equal to said pre-selected magnitude; a circulating pump associated with said first storage battery for activating said first storage battery; and, means for driving said pump by said first storage battery during said discharging mode of said first storage battery, the improvement in said system comprising: a second storage battery; manually actuated start means producing an enabling signal to allow said D.C. motor to be driven by said first storage battery, means for driving said circulation pump for the first storage battery with said second storage battery for a limited time after manual actuation of said start means.

2. The improvement as defined in claim 1 wherein said limited time is controlled by a characteristic of said first storage battery.

3. The improvement as defined in claim 2 wherein said characteristic is voltage.

4. The improvement as defined in claim 2 wherein said characteristic is a temperature within said first storage battery.

5. The improvement as defined in claim 1 wherein said first battery has an operating voltage of a preselected magnitude and said second battery has an operating voltage with a magnitude substantially below said preselected magnitude and including a first control circuit including said first storage battery; a second control circuit including said second storage battery; an external connection on said vehicle and adapted to connect an external voltage source to said first control circuit, said external voltage source having a voltage magnitude generally equal to said preselected magnitude; and a voltage converter means between said control circuits for converting voltage of said first control circuit to the voltage magnitude of said second control circuit; means for driving said pump selectively by said second control circuit.

6. The improvement as defined in claim 5 including means for charging said second storage battery by said voltage converter means.

7. The improvement as defined in claim 6 wherein said manually actuated means includes switching means for selectively connecting said second control circuit to said D.C. drive motor control means.

8. The improvement as defined in claim 5 wherein said manually actuated means includes switching means for selectively connecting said second control circuit to said D.C. drive motor control means.

9. The improvement as defined in claim 1 and having a control circuit including said first storage battery and means for connecting said first storage battery by said control circuit to an external voltage source having a voltage magnitude generally equal to a preselected value and internal means for charging said second battery by said control circuit.

10. In a control system for an electric powered motor vehicle of the type including a D.C. motor drivingly connected to roadway engaging drive wheels of said vehicle, said control system including control means for operating said D.C. drive motor with a voltage having a preselected magnitude; a first storage battery supported on said vehicle and having a charging mode and a discharging mode with a voltage rating during both of said modes generally equal to said preselected magnitude; a second storage battery supported on said vehicle and having a charging mode and a discharging mode with a voltage rating during both of said modes at a magnitude substantially less than said preselected magnitude; and first and second pumps associated with said first storage battery with both of said pumps driven during said charging mode of said first storage battery and one of said pumps being driven during said discharging mode of said first storage battery, the improvement comprising: a first control circuit including said first storage battery; a second control circuit including said second storage battery; an external connection on said vehicle and adapted to connect an external voltage source to said first control circuit, said external voltage source having a voltage magnitude generally equal to said preselected magnitude; a voltage converter means between said control circuits for converting voltage of said first control circuit to the voltage magnitude of said second control circuit; means for driving said one pump selectively by said second control circuit; and, means for activating said D.C. drive control means by said second control circuit.

11. The improvement as defined in claim 10 including means responsive to the current flow in said first storage battery to termination of said driving of said one pump by said second control circuit.

12. The improvement as defined in claim 11 including means for charging said second storage battery by said voltage converter means.

13. The improvement as defined in claim 12 wherein said activating means includes switching means for selectively connecting said second control circuit to said D.C. drive control means for operating said D.C. drive motor.

14. The improvement as defined in claim 10 including means for charging said second storage battery by said voltage converter means.

15. The improvement as defined in claim 14 wherein said activating means includes switching means for selectively connecting said second control circuit to said D.C. drive control means for operating said D.C. drive motor.

16. The improvement as defined in claim 10 wherein said activating means includes switching means for selectively connecting said second control circuit to said D.C. drive control means for operating said D.C. drive motor.

* * * * *